Patented June 3, 1941

2,243,897

UNITED STATES PATENT OFFICE 2,243,897

SYNTHETICAL PRODUCTION OF PARAFFIN

Franz Fischer and Helmut Pichler, Mulheim-Ruhr, Germany, assignors, by mesne assignments, to Hydrocarbon Synthesis Corporation, Linden, N. J.

No Drawing. Application July 23, 1938, Serial No. 220,918. In Germany July 30, 1937

4 Claims. (Cl. 260—449)

Our invention relates to the synthetical production of paraffin from carbon monoxide and hydrogen. It is an object of our invention to provide means for producing paraffin, which is solid at room temperature, in a particularly advantageous manner.

It is well known to those skilled in the art, when producing benzine from carbon monoxide and gases containing hydrogen in the presence of highly active catalysts containing metals of the eighth group of the periodic system and operating under atmospheric pressure, there are formed aliphatic hydrocarbons boiling at different temperatures and amongst these hydrocarbons also solid paraffin is formed.

According to the conditions of operating the proportion of paraffin thus formed ranges between 4 and 10%, forming only a small part of the reaction products obtained, most of which escape from the reaction zone in the form of gases or vapors. The comparatively small quantities of paraffin adhering to the catalyst are removed at the end of each period of operation, i. e. after several weeks or months, from the catalyst by extraction or by other well known means.

In the carrying out of the synthetical production of benzine it was found to be particularly advantageous to react about 1 cubic meter of the mixture of carbon monoxide and hydrogen per hour per 1 kg. cobalt or, which is about the same, per 10 litres of the space filled up with the catalyst mass. When operating with these proportions, about 100 grams of the reaction products can be obtained, when starting the operation, and about 80 grams after 6-8 weeks. If only 50% or even only 10% of the quantity of gas mentioned above is passed per hour through the reaction chamber, the yield slightly rises, but in view of the unfavorable yield per time and volume operation under these conditions is unsatisfactory from an economical point of view. With lowered velocity of flow of the gases and with a longer period of operation the kind of reaction products remains about the same, if operating under atmospheric pressure, the reaction products consisting almost exclusively of oil, benzine and "gasol" i. e. gaseous aliphatic hydrocarbons with more than 2 carbon atoms in the molecule.

One has also reacted carbon monoxide with hydrogen under increased pressure, for instance 5 or 80 atmospheres in the presence of cobalt catalysts. In these tests the choice of the quantities of gases to be reacted was governed by the consideration that, if the pressure is raised for instance to 5 times its amount, also 5 times the quantity of gas (measured at atmospheric pressure) can be passed through the apparatus per unit of time. Therefore previous operations were conducted either at different pressures, the gases remaining in the reaction zone for about the same period of time, or operations were carried through in closed vessels, in which the gases were enclosed; in other cases the influence of the time during which the gases remained in the reaction chamber were not taken into consideration at all.

We have now found that in the catalytic hydrogenation of carbon monoxide under pressure, in order to obtain a maximum yield, the gases must remain in the reaction zone during an exactly predetermined period of time. We have found that, contrary to the ideas hitherto entertained, substantially in proportion as the pressure rises, also the period of time must be increased, during which the gases remain in the reaction zone. Therefore, in order to obtain a maximum yield of solid hydrocarbons under a pressure of 5 atmospheres, the time during which the gases remain in the contact zone, must be about 5 times as long, and if operating under 20 atmospheres pressure, about 20 times as long as the time required under atmospheric pressure. If, contrary to this rule, the gases are left under 20 atmospheres in the reaction zone only 10 times as long as under ordinary pressure, the yield will be 30–50% lower, although this time is still the double of the time required under an operating pressure of 5 atmospheres. Any increase of the time beyond the rule laid down above does not materially improve the yield. On the other hand, when operating with stationary gases, the yield drops materially, since in that case the products formed in the reaction are exposed during an unduly long period of time to the action of the catalyst.

Particularly advantageous results both regarding the yield obtainable per cubic meter of starting gas and as regarding the life of the catalyst can be obtained, if the operation is conducted under a pressure of about 5–20 atmospheres with the gases remaining in the catalyst chamber in about the same proportion.

If it is desired to withdraw the heat of reaction by cooling with water, we have found it preferable to use in the reaction chamber the same operating pressure as prevails in the water outside of the reaction chamber, since in that case the walls are not acted upon by any onesided pressure and may be made of particularly inexpensive material. The gas pressure is preferably so chosen that it is equal to the saturation pressure of water vapor at the temperature of operation. When operating with cobalt catalysts, the operations should be conducted at temperatures below 250° C.

*Example*

A catalyst produced by precipitation and consisting of cobalt, thorium and kieselguhr is first tested for efficiency at atmospheric pressure with a gas mixture consisting of one part carbon monoxide and two parts hydrogen. This test may for instance show that when passing 100 litres of the gas mixture per hour through one litre of the space filled with the catalyst, there occurs at 190° C. the maximal contraction of the gases amounting to 80%, while mostly liquid hydrocarbons are formed. If the volume of gases passed through the reaction zone is increased or if the temperature is raised or lowered, the yield drops materially, in one case owing to an undesirable formation of gaseous hydrocarbons, in the other case by an incomplete reaction. If now, instead of the liquid hydrocarbons larger quantities of the solid paraffins are to be produced, the pressure is raised to a multiple of the atmospheric pressure and the time during which the gases are allowed to stay in the reaction chamber, is raised in the same proportion. Since in the course of a long period of operation the temperature must be gradually raised, we have found it advantageous to operate for instance at 180° C. under a pressure of 10 atmospheres, leaving the gases in the reaction zone 10 times as long as under atmospheric pressure, while when operating at a temperature of 200° C. and under a pressure of 15 atmospheres, the gases are left in the reaction chamber 15 times as long as when operating under ordinary pressure.

The best yield, about 150-160 grams per cubic meter gas, (being a mixture of 1CO:2H$_2$) is obtained under a pressure ranging between 5 and 20 atmospheres. After continuous operation during one year the same body of catalyst still produces 100 grams per cubic meter of the gas without requiring any regeneration.

If, in order to simplify the construction of the reaction apparatus, operations are conducted under equal pressures in the contact chamber and the cooling system, the same yields are obtained at temperatures of 175-205° C. and under corresponding pressures of 8-17 atmospheres with the gases remaining in the reaction zone about 8-17 times as long as when operating under atmospheric pressure.

Up to 60% of all reaction products boil above 300° C. and form a pure white odorless paraffin, solid at room temperature, which melts at about 100° C., forming an altogether clear fluid. The balance of 40% of the reaction products consists of oil, benzine and gasol.

The paraffin thus obtained may be used as such or as a raw material in the production of fatty acids. It may also serve for the production of olefines and knocking proof benzine by cracking, since the high yield of the new process fully compensates the losses suffered in the cracking process.

Various changes may be made in the details disclosed in the foregoing specification without departing from the invention or sacrificing the advantages thereof.

We claim:

1. In the process of producing solid paraffin from a mixture of carbon monoxide and hydrogen in the presence of a cobalt catalyst and under superatmospheric pressure ($p'$), the improvement which consists in maintaining the gas mixture in the reaction zone for about a period of time ($t'$) as determined by the equation $t':t=p':p$ in which $t=$the time required to obtain maximum output when operating under a pressure of one atmosphere ($p$), while $p'$ is the pressure in atmospheres under which the reaction is carried out.

2. The process of claim 1, in which the operation is carried through at a pressure varying between 5 and 20 atmospheres.

3. The process of claim 1, in which the pressure, under which the operation is carried through, is equal to the saturation pressure of water vapor at the operating temperature.

4. The process of claim 1, in which operation is carried through at a high temperature not exceeding 250° C.

FRANZ FISCHER.
HELMUT PICHLER.